United States Patent [19]

Dörbandt

[11] 3,971,529
[45] July 27, 1976

[54] FISHING REEL
[75] Inventor: Klaus Dörbandt, Berlin, Germany
[73] Assignee: Deutsche Angelgerate Manifaktur (DAM) Hellmuth Kuntze Gesellschaft mit beschrankter Haftung K.G., Berlin, Germany
[22] Filed: May 15, 1975
[21] Appl. No.: 577,893

[30] Foreign Application Priority Data
June 4, 1974   Germany............................ 2427157

[52] U.S. Cl. .............................................. 242/211
[51] Int. Cl.² ......................................... A01K 89/00
[58] Field of Search ............ 242/211, 212, 215, 221

[56] References Cited
UNITED STATES PATENTS
943,820   12/1909   Durkee et al. ...................... 242/211
2,054,306   9/1936   Stringer .............................. 242/221
2,197,779   4/1940   Coxe ................................... 242/221

Primary Examiner—S. Clement Swisher
Attorney, Agent, or Firm—V. Alexander Scher

[57] ABSTRACT

A fishing reel has a slide movable selectively against the action of a return spring into a locked position. The slide is used for shifting a gear wheel of the drive without engagement with a shaft for driving a spool, whereby an input gear wheel driven by a crank is provided with a stop which releases the locking of the slide when the input gear wheel is rotated. The invention is particularly characterized in that the stop is provided upon a separate structural part which is swingably connected in the circumferential direction for a limited movement with the inlet gear wheel.

5 Claims, 6 Drawing Figures

FISHING REEL

This invention relates to a fishing reel having a slide movable selectively against the action of a return spring into a locked position for shifting a gear wheel of the drive without engagement with a shaft for driving a spool, whereby an input gear wheel driven by a crank is provided with a stop which releases the locking of the slide when the inlet gear wheel is rotated.

In known constructions the stop is fixed directly upon the input gear wheel. When the input gear wheel is moving while the slide is being actuated, it can not attain its locking position since the force of the slide is insufficient to rotate the inlet gear wheel and to push away the stop. It is then necessary to rotate the inlet gear wheel. This additional operation is not only inconvenient but it also has the drawback of delaying the desired immediate stop of the drive.

An object of the present invention is to improve fishing reels of the described types by constructing them in such manner that the interruption of the drive takes place independently from the actual position of the stop solely by actuating the slide.

Other objects of the present invention will become apparent in the course of the following specification.

In the accomplishment of the objectives of the present invention it was found desirable to provide the stop upon a separate structural part which is swingably connected in the circumferential direction for a limited movement with the input wheel. Then the stop which is possibly located in the range of movement is taken along by the slide while swinging the part carrying it, so that the slide can reach its locking position.

According to a further construction of the present invention means are provided which permit the swinging movement between the input gear wheel and the stop. These means consist in that a cylindrical plug with two parallel flat portons is mounted upon the shaft of the input gear wheel, the plug engaging in a central passage the part carrying the stop. Furthermore, the passage on the two parallel surfaces has two supports for the plug and recesses which permit a relative movement of the part to the inlet gear wheel between the two supports.

An embodiment of the present invention provides that the structural part carrying the stop is swingably connected with the input gear wheel by a pin extending excentrically to its axis and that the passage in the part has dimensions similar to the cross-section of the plug at the shaft of the inlet gear wheel, but somewhat greater in length and width.

According to a preferred embodiment of the present invention the plug at the shaft of the input gear wheel lies against the cylindrical surfaces of the passage extending to the axis of the input gear wheel in the part carrying the stop. This simplifies the swingable connection between the inlet gear wheel and the stop and provides, according to a further feature of the invention, that the structural part can have several stops divided over its perifery. This provides a release of the locking of the slide already after a smaller rotary angle of the crank.

The invention will appear more clearly from the follow-detailed description when taken in connection with the accompanying drawings showing by way of example only, preferred embodiments of the inventive idea.

Figure 1:
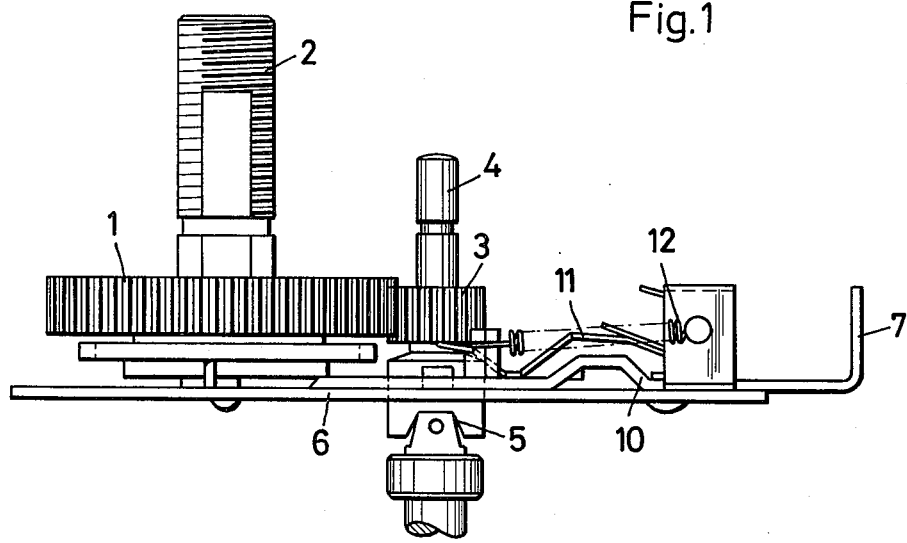
FIG. 1 is a side view of the fishing reel parts necessary for explaining the present invention in their driving position.

The fishing reel shown in FIGS. 1 to 4 includes an input gear wheel 1 upon an inlet shaft 2 carrying a crank (not shown). The input gear wheel 1 cooperates with a gear wheel 3 which is axially shiftable upon a shaft 4 for driving a spool (not shown). In its lower position the gear wheel 3 is coupled by a coupling member 5 with the shaft 4. When the gear wheel 3 is shifted upwardly this coupling is released so that then the shaft 4 is not driven. This operation is carried out by a slide 7 mounted in the casing 6, which is slidable along a slit 8 and is swingable about a pin 9 extending through the slit.

The slide 7 has a cam surface 10 which cooperates with a corresponding cam surface of a switch part 11 fixed in the casing 6, the surface 10 engaging around shaft 4 below the gear wheel 3.

Figure 3:
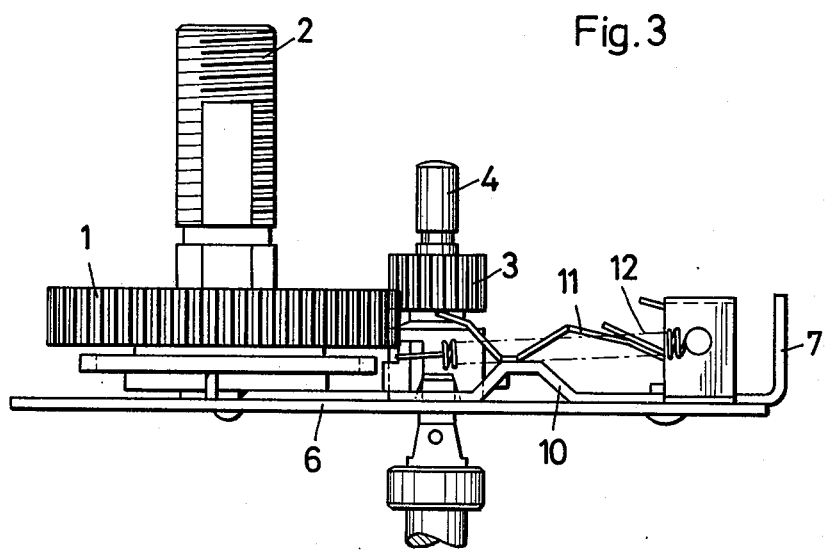
FIG. 3 is similar to FIG. 1 but shows the parts in the locking position of the slide.
Figure 2:
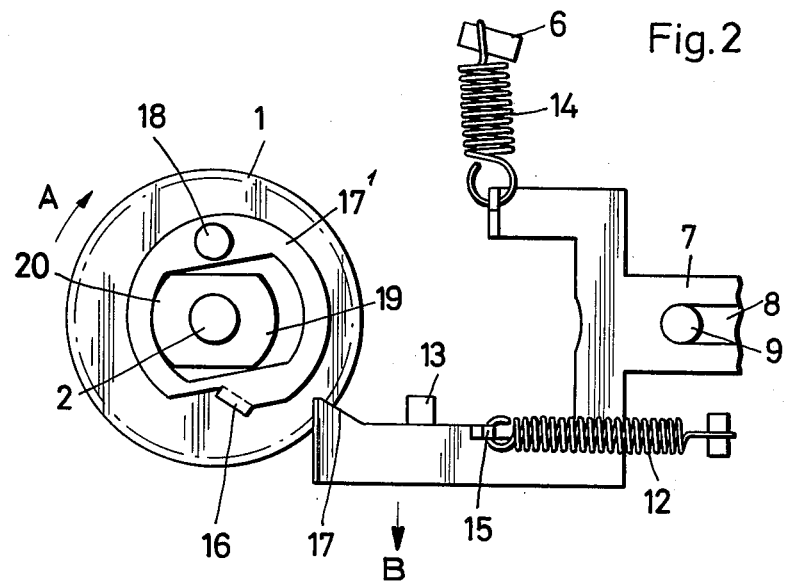
FIG. 2 is a top view of the device shown in FIG. 1.
Figure 4:
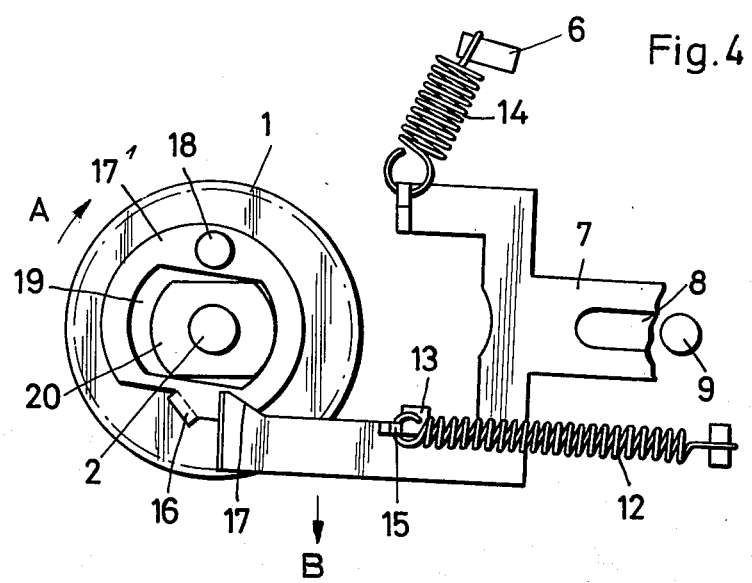
FIG. 4 is a top view of the device shown in FIG. 3.

When the slide 7 is shifted from the position shown in FIGS. 1 and 2 to the position shown in FIGS. 3 and 4, the gear wheel 3 is raised, so that the return spring 12 is tensioned. During this movement the slide 7 is supported by a bar 13 fixed to the casing. When the slide 7 reaches the shown left hand end position, a pulling spring 14 provided between the casing 6 and a leg of the slide 7 will swing the slide about the pin 9 in the direction opposite to that of the arrow B shown in the drawings, so that a shoulder 15 of the slide will engage the locking bar 13, and the slide will be locked in this position.

To release the locking the crank must be turned in the direction of the illustrated arrow A, whereby the stop 16 is brought against a ramp 17 at the end of the slide 7 and swings it in the direction of the arrow B, so that the slide is released from the lock 13 and is moved by the return spring 12 back into the positions shown in FIGS. 1 and 2. In this position the switch part 11 permits the downward movement of the gear wheel 3 for engagement with the shaft 4. The spring 14 is then tensioned.

The stop 16 is provided upon a structural part $17^1$ which is swingably connected with the input gear wheel 2 by a pin 18 extending excentrically to the input shaft 18 and which contains a central passage 19 with two parallel surfaces and two cylindrical surfaces. Through this passage extends a pin 20 of the inlet shaft 2, which has a cross-section similar to but smaller than that of the passage 19, so that line-shaped supports are provided between the pin and the flat walls of the passage.

When the input gear wheel 1 is rotated in the direction of the arrow A and when the slide 7 is in the position shown in FIGS. 3 and 4, then the pin 20 lies against the wall of the passage 19, as shown in FIG. 2. When the stop 16 is located in the passage of the slide during the inward movement of the slide out of the position shown in FIGS. 1 and 2 and before it reaches its locking position, then the stop 16 is taken along so that the structural part $17^1$ can move relatively to the inlet gear wheel 1 until the pin 20 has reached its position relatively to the passage 19 which is shown in FIG. 4. During this movement it is not necessary to rotate the input gear wheel.

Figure 5:
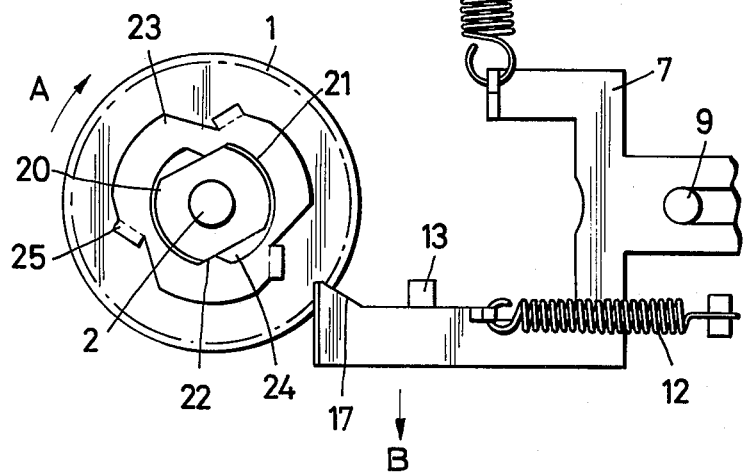
FIG. 5 is a top view of a different construction in its driving position.
Figure 6:
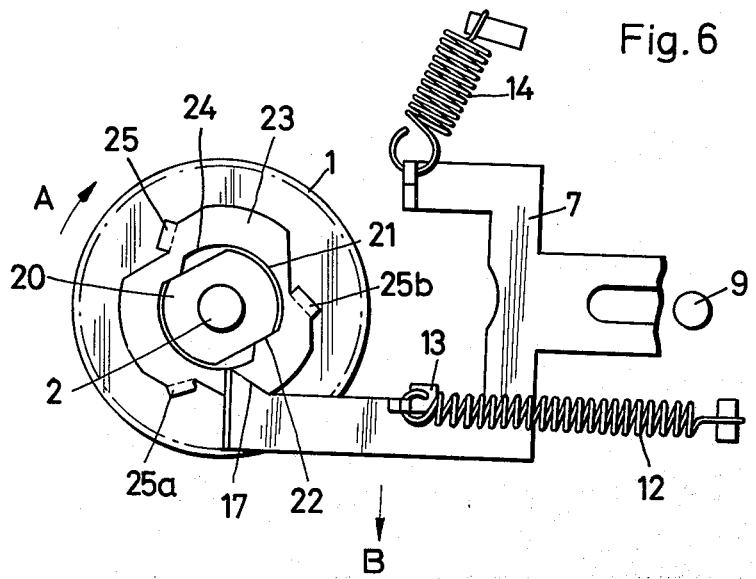
FIG. 6 is similar to FIG. 5 but shows the slide in its locking position.

A different constructuion is shown in FIGS. 5 and 6. However, parts which are the same as in the first construction are indicated by the same reference characters. The slide 7 and the parts connected therewith are the same as in the first construction. The pin 20 at the input shaft 20 is also shaped as in the first construction, but its cylindrical surfaces 21 lie against corresponding surfaces of the passage 22 of a structural part 23, thereby providing the arrangement of the structural part and the fact that it will be taken along. The passage 22 has in the range of its flat surfaces recesses 24 constituting extensions of cylindrical surfaces, so that supporting surfaces are provided in that location. This makes possible a free rotation of the structural part 23 about the input gear wheel 1 between the formed supporting surfaces. In this embodiment the possibility is provided of placing several stops 25 about the circumference of the structural part 23. If, for example, the stop 25a (FIG. 6) is in the way during the shifting of the slide 7, then it is taken along by the slide substantially to the position shown in FIG. 6. If the locking of the slide is then released by rotating the crank then it actuates the stop 25b (FIG. 6) which is substantially closer to the ramp 17, the actuation taking place earlier than that which could apply to the stop 25a, if only that stop would be available. Then the drive is again switched on with a lesser rotary angle of the crank.

I claim:

1. In a fishing reel, in combination, a slide, a return spring connected with said slide, a shaft, a gear wheel movably mounted upon said shaft, said slide being adapted to engage and move said gear wheel and having a locked position, an input gear wheel, a separate member, means swingably connecting said member in a circumferential direction for a limited movement with said input gear wheel, and a stop carried by said member and adapted to engage said slide when said member is swung along with said inlet gear wheel to release the locked position of the slide.

2. A fishing reel according to claim 1, comprising another shaft carrying said input gear wheel, a cylindrical pin carried by said other shaft and having two parallel flat portions, said member having a central passage, said pin extending through said passage, said passage having parallel surfaces for supporting said pin and recesses permitting a relative movement of said member to said input gear wheel.

3. A fishing reel according to claim 2, comprising a pin swingably connecting said member with said input gear wheel and extending excentrically to the axis of said input gear wheel, and wherein said passage has dimensions similar to but somewhat smaller in length and width than the dimensions of said pin.

4. A fishing reel according to claim 2, wherein the first-mentioned pin and said passage have opposed interengaging cylindrical surfaces extending parallel to the axis of said input gear wheel.

5. A fishing reel according to claim 4, comprising a plurality of stops carried upon the outer surface of said member.

* * * * *